(12) United States Patent
Smith et al.

(10) Patent No.: US 9,683,670 B2
(45) Date of Patent: Jun. 20, 2017

(54) FRANGIBLE PLUG FOR USE IN A VALVE MECHANISM

(71) Applicant: Kidde Graviner Limited, Slough, Berkshire (GB)

(72) Inventors: Paul D. Smith, Camberly (GB); Paul Alan Rennie, Bracknell (GB); Robert G. Dunster, Burnham (GB)

(73) Assignee: KIDDE GRAVINER LIMITED, Colnbrook, Slough, Berkshire (GB)

( * ) Notice: Subject to any disclaimer, the term of this patent is extended or adjusted under 35 U.S.C. 154(b) by 0 days.

(21) Appl. No.: 14/881,850

(22) Filed: Oct. 13, 2015

(65) Prior Publication Data
US 2016/0102774 A1 Apr. 14, 2016

(51) Int. Cl.
| | |
|---|---|
| F16K 17/38 | (2006.01) |
| F16K 17/40 | (2006.01) |
| F16K 31/00 | (2006.01) |
| F16K 31/02 | (2006.01) |
| A62C 37/48 | (2006.01) |
| A62C 3/07 | (2006.01) |
| A62C 35/10 | (2006.01) |

(52) U.S. Cl.
CPC ............ *F16K 17/403* (2013.01); *A62C 37/48* (2013.01); *F16K 31/002* (2013.01); *F16K 31/025* (2013.01); *A62C 3/07* (2013.01); *A62C 35/10* (2013.01)

(58) Field of Classification Search
CPC .... F16K 31/025; F16K 31/002; F16K 17/403; A62C 37/48; A62C 3/07; A62C 35/10
USPC ............................................. 137/74, 72, 79
See application file for complete search history.

(56) References Cited

U.S. PATENT DOCUMENTS

| | | | | |
|---|---|---|---|---|
| 3,915,235 A | * | 10/1975 | Hamilton | F16K 17/403 137/68.13 |
| 3,927,791 A | * | 12/1975 | Hershberger | F22B 37/46 102/481 |
| 6,260,818 B1 | * | 7/2001 | Grummon | F15C 5/00 251/11 |
| 6,682,521 B2 | | 1/2004 | Petrakis | |
| 7,260,932 B1 | * | 8/2007 | Klimowicz | F16K 7/045 60/527 |

(Continued)

FOREIGN PATENT DOCUMENTS

| | | |
|---|---|---|
| DE | 19736247 A1 | 2/1999 |
| EP | 1582789 A1 | 10/2005 |

(Continued)

OTHER PUBLICATIONS

International Search Report for application No. GB1418080.6; Mailing Date Jan. 9, 2015, 3 pages.

*Primary Examiner* — Mary McManmon
*Assistant Examiner* — Minh Le
(74) *Attorney, Agent, or Firm* — Cantor Colburn LLP

(57) ABSTRACT

A frangible plug for use in a valve mechanism, the frangible plug including a first section having a first end and an opposing second section having a second end and a cylindrical sidewall extending between the first and second ends. Also including means for applying a force on the cylindrical sidewall of the frangible plug such that the first section fractures from the opposing second section, and wherein the means for applying a force on said cylindrical sidewall extends circumferentially around the outer circumference of the sidewall.

10 Claims, 4 Drawing Sheets

(56) References Cited

U.S. PATENT DOCUMENTS

| | | | |
|---|---|---|---|
| 7,280,016 B2* | 10/2007 | Taya | B64C 21/02 |
| | | | 200/181 |
| 7,281,544 B2* | 10/2007 | Bocquart | F16K 31/02 |
| | | | 137/68.11 |
| 7,703,471 B2 | 4/2010 | Edwards | |
| 8,499,779 B2* | 8/2013 | Gillespie | F16K 27/00 |
| | | | 137/15.18 |
| 8,820,069 B2* | 9/2014 | Makinson | F16K 17/386 |
| | | | 60/527 |
| 9,212,754 B2* | 12/2015 | Jackson, Jr. | F16K 17/386 |
| 2005/0173661 A1* | 8/2005 | Mignon | F16K 31/002 |
| | | | 251/11 |
| 2010/0025050 A2 | 2/2010 | Johnson et al. | |
| 2011/0088792 A1* | 4/2011 | Ito | F16K 31/025 |
| | | | 137/468 |

FOREIGN PATENT DOCUMENTS

| | | |
|---|---|---|
| EP | 2778486 A2 | 9/2014 |
| GB | 567120 A | 1/1945 |
| GB | 1378079 A | 12/1974 |

\* cited by examiner

FRANGIBLE PLUG FOR USE IN A VALVE MECHANISM

FOREIGN PRIORITY

This application claims priority to United Kingdom Patent Application No. 1418080.6 filed Oct. 13, 2014, the entire contents of which is incorporated herein by reference.

BACKGROUND

A frangible plug for use in a valve mechanism, and, more particularly, a single-use valve mechanism that may be used for discharging fluid is described herein. The frangible plug and valve mechanism may have particular use in the field of suppressant release, such as a fire suppressant fluid.

The examples described herein relate to devices and methods for the controlled release of a fluid flow substance. They are particularly suited, but not limited, to the controlled release of a suppressing or extinguishing agent from a cylinder. The devices and methods described may further be used for the rapid deployment of an extinguishing agent from a cylinder, such as those that may typically, although not exclusively, be used on moving platforms such as aircrafts, trains, military or commercial vehicles.

Such valves fall into two main groups; non-hermetic and hermetically sealed. The former category is typified by the high rate discharge (HRD) valves used on suppressors in military and commercial vehicles. These can be electromechanical or protractor fired, consisting of either a flapper or poppet as the main openings mechanism. Both systems contain multiple moving components and rely on O-ring seals for integrity. Such valves can be relatively expensive and require refurbishment prior to use.

Further applications, such as aerospace, require that the suppressor be hermetically sealed to minimise leakage over the required environmental range and to extend service life. Such hermetically sealed extinguishers use an explosive cartridge located on the outside of an outlet diaphragm, which upon actuation ruptures a disc and releases agent into a distribution network or directly into the protected fire zone. This method, although very fast and reliable, is prone to fragmentation of the diaphragm during actuation and requires the use of pyrotechnic cartridges. These valves require periodic maintenance and replacement and have associated handling, transit and storage restrictions.

The examples described herein aim to retain the rapid opening and free flow characteristics of the prior art, whilst reducing cost, removing pyrotechnic cartridges and providing the option for hermiticity where required.

DE 19736247 discloses a component having a body made of brittle material and the use of piezoelectric elements both embedded and laminated into the body such that, when the body is energized by the piezoelectric elements, a portion of the component is destroyed.

US 2010/025050 discloses a thermally activated sprinkler valve that includes a shape-memory element that expands as it is heated, forcing a bolt to break, thereby opening the sprinkler valve.

U.S. Pat. No. 6,682,521 describes numerous methods of opening a pressure containing vessel through the use of memory shape alloys.

European Patent Application No. 14160040 discloses a ceramic disc with a pre-defined stress plane which is fractured by impact by a point force. Means for braze attachment of the disc, means for minimising fragmentation and a means for retaining the free section of the disc after fracture are also disclosed.

EP 1582789 describes devices and methods for controlling the release of a substance which are particularly suited to the control of substances such as fire extinguishing media. The devices and methods described comprise a housing having an inlet for connection to a source of a substance and an outlet, with a passage extending therebetween. The passage may be closed by a frangible element which comprises a ceramic disc that is connected to a source of electrical current. The disc may be a metal oxide ceramic disc, and may be fractured by an electrical pulse which is applied to the disc.

GB 1378079 describes a bursting disc assembly, and in particular a vessel having an aperture sealed by the bursting disc assembly. The bursting disc assembly is comprised of toughened glass that is shattered by a movable spike which is projected against the glass with sufficient force to rupture the surface layer thereof and consequently shatter the disc. The spike is moved via pressure created by the ignition of a pyrotechnic composition.

GB 567120 discloses a quick-release valve arrangement for a container of fluid under pressure which is aimed at enabling fluid to be released in a simple and rapid manner. The valve arrangement comprises a hollow body or casing formed with a valve seat as well as a valve that is shaped to fit upon the valve seat to seal up the passage leading from the fluid container. A frangible disc, which may be formed from cast iron, pottery, glass or brittle plastic, is located within the valve body and spaced from the valve proper by a strut member which serves to hold the valve down on its seat. The device also includes a plunger that is used to shatter the disc and release the valve. The disc may also be shattered in other ways such as by providing an explosive charge or via a small projectile driven by the explosion striking the disc.

U.S. Pat. No. 7,703,471 discloses a remotely-operated single-action discharge valve for releasing gaseous, liquid, or dry material from a pressurized storage vessel. A frangible seal is provided within a valve body which seals the passage therethrough when the seal is intact. A solenoid is described which includes an armature moveable from a first position to a second position when the solenoid is actuated. The device includes a tooth, teeth or a pin or plurality of pins which break the frangible seal as the armature moves between the first and second position. The seals described are held in place using an o-ring and can be made of glass.

SUMMARY

In one example, there is provided a frangible plug for use in a valve mechanism, the frangible plug comprising a first section having a first end and an opposing second section having a second end and a cylindrical sidewall extending between the first and second ends, and means for applying a force on the cylindrical sidewall of the frangible plug such that the first section fractures from the opposing second section, and wherein the means for applying a force on said cylindrical sidewall extends circumferentially around the outer circumference of the sidewall.

Further, the means for applying a force on the cylindrical sidewall of the frangible plug may be actuated on application of heat.

The means for applying a force on the cylindrical sidewall of the frangible plug may be a shape memory alloy actuator.

Further, the shape memory alloy actuator may comprise one or more shape memory alloy wires.

The one or more shape memory alloy wires are crimped or welded to each other at a point adjacent to the sidewall of the frangible plug.

The shape memory alloy actuator may further comprise one or more secondary metal wires.

Further, a groove may be formed in the sidewall and wherein the shape memory alloy actuator is positions in said groove.

In a further example, the frangible plug further comprises a recess having an open end at the second end of the plug; and wherein said plug comprises a predefined fracture plane and wherein said plug is configured to fracture across said predefined fracture plane, and wherein said predefined fracture plane extends around the outer circumference of the sidewall; and a closed end, within the plug, with an inner surface of the cylindrical sidewall extending therebetween, said predefined fracture plane intersecting the sidewall within the recess to provide the predefined fracture line that extends around the inner circumference of the sidewall of the frangible plug.

Further, a groove may be formed in the predefined fracture plane and wherein the one or more shape memory alloy wires is positioned in the groove.

The groove may be located in the first section adjacent the first bevelled portion.

The diameter of the recess may be smaller at the closed end of the recess than at the open end of the recess and the outer surface of the sidewall has a first bevelled portion, and the inner surface of the sidewall has a second bevelled portion, and wherein a part of the bevelled portion of the outer surface that has the smallest diameter may lay in the same plane as a part of the bevelled portion of the inner surface that has the greatest diameter.

In another example, there is provided a valve mechanism comprising a valve body having an inlet port and an outlet port and a passageway extending therebetween and a frangible plug as described above, wherein the plug is held within the valve body such that the plug blocks the passageway when intact and wherein, when the frangible plug is fractured, fluid flows from the inlet port to the outlet port.

Further, The first end of the frangible plug may be in flow communication with the outlet port and the second end of the frangible plug may be in flow communication with the inlet port.

BRIEF DESCRIPTION OF THE DRAWINGS

Examples of an improved frangible plug for use in a valve mechanism and a valve mechanism are herein described with reference to the accompanying drawings.

DETAILED DESCRIPTION

In general, a frangible plug 10 is provided between an inlet port to an outlet port of a valve mechanism (described later). The frangible plug prevents fluid from flowing through a conduit until it is activated, by forming a seal across the valve between the inlet and outlet ports. When the frangible plug is activated, fluid can flow through the conduit from the inlet port to the outlet port of a valve mechanism.

Generally, the frangible plug 10 has a cylindrical sidewall and, circumferentially extending around the cylindrical sidewall, is provided a means for applying a force to the cylindrical sidewall of the plug. When the means for applying a force to the plug is activated, the frangible plug fractures such that fluid may flow through the conduit from the inlet port to the outlet port.

Figure 1A:
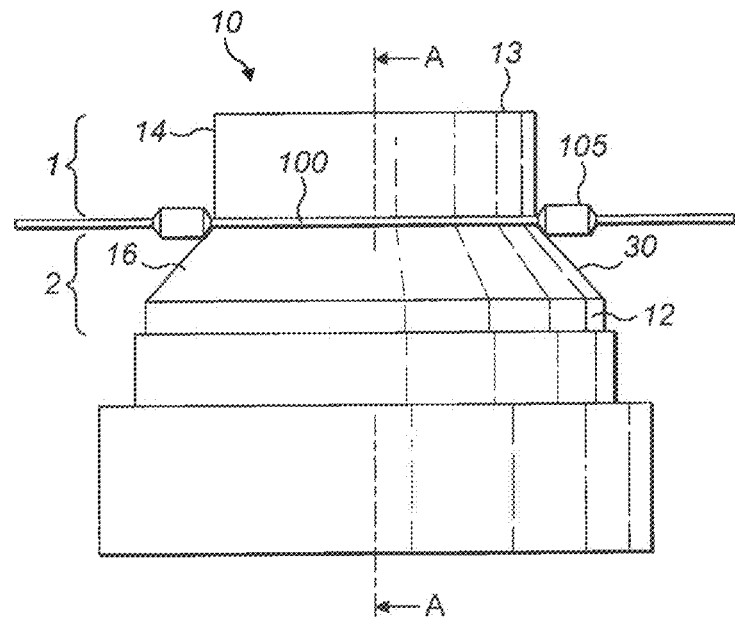
FIG. 1A shows a view of a frangible plug.
Figure 1B:
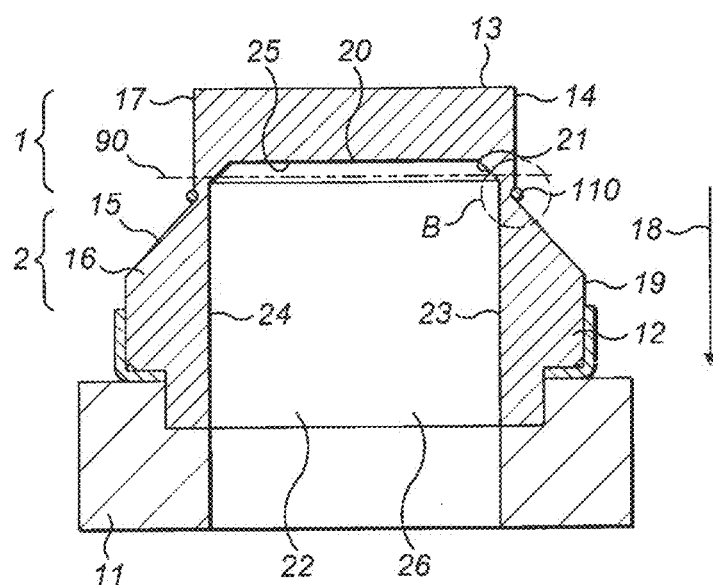
FIG. 1B shows a view of a section A-A of the frangible plug of FIG. 1A.
Figure 1C:
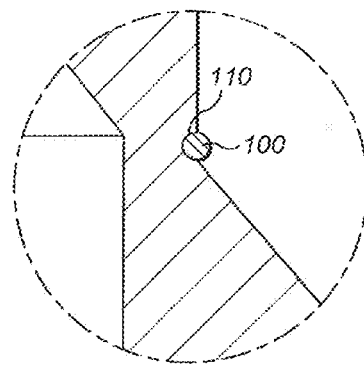
FIG. 1C shows a detailed view of section B of the frangible plug of FIG. 1B.

An example of a frangible plug is shown in FIGS. 1A-1C, but it is envisaged that the plug may be shaped other than a 'top hat' arrangement discussed below. What is important is that the frangible plug has a means for applying a force to a cylindrical sidewall of the plug and that the means for applying the force circumferentially extends around the cylindrical sidewall.

The frangible plug described herein may be formed from a brittle ceramic material, for example alumina, but may also be formed from any similarly brittle vitreous or polymeric material.

One example of a frangible plug described herein and shown in FIGS. 1A-1C is in the general shape of a 'top hat'. In this example, the plug is seen as having a continuous, closed first surface 13 which is generally flat at the first end 14. Although the first surface of the plug is described herein as being flat, this is not necessary, and the surface could be any other shape such as curved, or dome shaped. The plug also has an opposing second end 12. The outer perimeter of the surfaces at the first and second ends, 14 and 12, are generally circular in this embodiment, however, other shapes could be used, depending on the chosen design. The plug further has a sidewall 16 with an outer surface 30 which extends cylindrically between the first and second opposing ends, 14 and 12.

As seen in FIG. 1A, the plug has a first section 1 which includes the first end 14 and a second section 2 which includes the second end 12.

In detail, the outer surface 30, of the sidewall 16 of the plug shown in FIGS. 1A-1C comprises three portions, 15, 17, and 19, each with different diameters and therefore circumferences to each other. As can be seen in FIGS. 1A-1C, there is a portion of substantially uniform diameter and circumference at either end of the plug, 17 and 19, with a first angled or bevelled portion, or flange, of increasing/decreasing diameter therebetween 15. The circumference of the cylindrical portion at the second end 12 is also greater than that of the first end, thereby creating what would be the 'brim' of the 'top hat' shape. Although the end portions of the outer surface of the sidewall of the example shown herein are of generally uniform diameter, the diameter does not have to be completely uniform.

A second portion 15 of the sidewall 16 which is connected to the first portion 17 is bevelled and extends at an angle outwardly from the first portion 17 thereby comprising an increasing diameter in the direction 18 of the second end 12. The second portion 15 contacts the third portion 19 which is again generally uniform in diameter and cylindrical in shape and also extends generally parallel to the first portion 17 of the outer side wall. This third portion 19 therefore constitutes a flange, or the 'brim' of the 'top hat' shape and in the example shown has a generally uniform diameter. The outer diameter of the sidewall 16 is at its greatest in the third portion 19.

The first section 1 of the plug includes the first portion 17. The second section 2 of the plug includes the second portion 15 and the third portion 19.

As described above, the plug has a first, closed, continuous surface 13 at a first end 14 however, the opposing second end 12 of the plug defines an opening to a cylindrical recess 22 extending into the plug, which is seen in FIG. 1B as being positioned approximately in its centre.

As seen, for example, in FIG. 1B, the recess 22 has an open end 26, at the second end 12 of the plug, a closed end 20 within the plug, and an inner surface 23 of the cylindrical sidewall 16 extending therebetween. As can be seen in FIG. 1B, the diameter and circumference of the cylindrical wall at the closed end 20 of the recess is smaller than the diameter and circumference of the wall at the open end 26.

In greater detail, the cylindrical recess 22 is formed by the sidewalls having an inner surface that extends from the second surface 11 at the second end 12 of the plug in the direction of the first end 14. The inner surface, or sidewall 23 within the recess of the plug comprises a first portion 24 which extends cylindrically and is of generally uniform diameter from the second end 12 and second surface 11 of the plug. This first portion 24 of the inner surface of the sidewall also extends in a direction that is generally parallel to the end portions, 17, 19, of the outer surface of the sidewall, as described above, although this is not necessary. The inner surface 23 of the sidewall also comprises a second portion which is bevelled 21 wherein the diameter decreases in the direction of the first end 14 of the plug and the surface 25 at the closed end 20 of the recess 22.

The recess therefore terminates in a closed end 20 having a surface 25 that has a smaller diameter and circumference than the open end 26 of the recess at the second surface 11. In the figures, the surface at the closed end 20 of the recess 22 is shown as being flat, however, this is not necessary and any shaped surface can be used.

As described above, the outer surface of the sidewall 16 has a first bevelled portion 15 and the inner surface 23 of the side wall has a second bevelled portion.

As can be seen the figures, the part of the bevelled portion of the outer surface that has the smallest diameter lies in the same plane as the part of the bevelled portion of the inner surface that has the greatest diameter.

The above describes an arrangement of a "top hat" shape frangible plug, but it is envisaged that other arrangements and shapes could be used in conjunction with means for applying a force on the cylindrical sidewall, described below. What is important is that means for applying a force on the cylindrical sidewall provides a break in the seal to allow fluid to flow from the inlet port to the outlet port.

As shown in FIGS. 1A-1C, the frangible plug also comprises means 100 for applying a force on the cylindrical sidewall, 16, of the plug such that the first section, 1, fractures from the second section, 2. The means, 100, for applying a force on said cylindrical sidewall, 16, extends around the outer circumference of the sidewall, 16, as shown in FIG. 1A.

An example of means 100 for applying a force on the cylindrical sidewall 16 of the plug is shown in FIGS. 1A-1C and 2. In the example shown, this is an element that changes shape on heating; for example a shape memory alloy actuator may be used. In the examples shown in these figures, the shape memory alloy actuator is a shape-memory alloy wire extending around the outer circumference of the sidewall 16 and, in particular, around the circumferential line of weakness, or predefined fracture plane 90. The shape memory alloy wire may be formed from a Nickel Titanium alloy, such as Nitinol™, but may also be formed from other shape memory alloy material known in the art. The shape memory alloy wire, when activated, changes shape and expands in diameter. In some examples, the shape memory alloy wire is activated by increasing the temperature of the alloy. For example, the shape memory alloy wire may be connected to an electrical power supply in order to be actuated through electrical joule heating. An example of an electrical power supply could be a constant current supply or a current limited DC supply.

In the example shown in FIG. 1A, the shape memory alloy wire 100 extends around the circumference of the sidewall 16 and is positioned so as to be in the same plane as the predefined fracture plane 90. The shape memory alloy wire is maintained in a position around the circumference of the sidewall 16 such that movement and contraction of the wire is constrained. In one example, the shape memory alloy wire 100 is crimped by a crimp connector 105 in order to secure the shape memory alloy wire 100 in position around the circumference of the sidewall 16. Although the examples show crimp connectors, such as 105, the shape memory alloy wire may be secured by other means, such as welding etc.

The shape memory alloy wire 100 may be pre-strained by 5% to 10%. When the shape memory alloy wire 100 is heated above a transformation temperature, by for example electrical joule heating, the wire 100 will attempt to recover the strain by contracting in length and expanding in diameter. The strain recovery is however constrained by the crimp connectors 105 and a large localised stress (e.g. ~400 MPa) is thus imparted on the circumferential sidewall 16 at all points of contact. This stress initiates brittle fracture causing section 1 of the plug to fracture from section 2 of the plug. The wire 100 effectively 'cuts' through the circumference of the sidewall 16 of the plug and provides a clean break, which reduces the number of fragments after fracture. As an example, a NiTi alloy has a transformation temperature of between −50° C. and 95° C. However, other alloys, for example NiTiNb, could also be used which have a transformation temperature in excess of 110° C.

As shown in FIGS. 1B and 1C, a groove 110 may be formed in the sidewall 16 of the plug. The shape memory alloy wire 100 may be placed in the groove 110 before crimping or welding. The groove 110 allows for the shape memory alloy wire 100 to be positioned in the predefined fracture plane 90 and constrains movement and contraction of the shape memory alloy wire 100. After the shape memory alloy wire 100 has been crimped (or welded) by, for example, crimp connectors 105, the shape memory alloy wire 100 is heated above a transformation temperature, for example as described above.

The plug 10 may be configured to have a frangible plane along which the plug is fractured, when activated, to break the seal. In the examples described, the frangible plane can result from a tapered configuration which can result, for example, in a thinner wall portion. The frangible plane could be formed by a 'top hat' configuration such as that described above.

Due to the shape of the frangible plug 10, where the outer and inner surface have an abrupt change in their geometric shape, when a pressure is applied by a fluid in a recess in the frangible plug 10, a stress can be created on the surfaces of the plug 10 and the stress is concentrated in a predetermined plane. The seal may be broken by providing a force at the predetermined plane. The fluid can then flow from the inlet port to the outlet port.

As mentioned above, where the outer and inner surface of the sidewall have an abrupt change in their geometric shape, and in particular, due to the fact that the part of the bevelled portion on the outer surface of the sidewall that has the smallest diameter lies generally in the same plane as the part of the bevelled portion of the inner surface of the sidewall that has the greatest diameter, when a uniform pressure is applied to the second end 12 of the plug, and in particular, the recess 22, a stress is created and may be concentrated in a predetermined plane. The uniform pressure, for example by the fluid in the recess 22, applied may result in a plane of principal, or increased stress (relative to the surrounding areas) 90.

In this example, the weakened or frangible plane 90 can occur at this location because the thickness of the sidewall of the plug is at its minimum in this plane, due to the relative positions of the bevelled portions present in the outer surface of the sidewall 30 and the inner surface of the sidewall of the recess 23 and their corresponding diameters and circumferences, as seen in FIG. 1B.

Figure 1D:
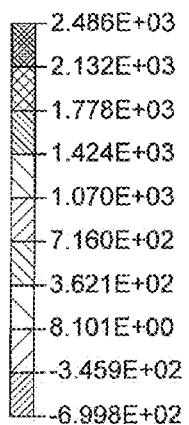
FIG. 1D shows, via Finite Element Analysis (FEA) the principal stress distribution of the plug shown in FIGS. 1A-1C when a uniform pressure is applied to the part of the plug that is in flow communication with an inlet port of a valve.
Figure 1D:
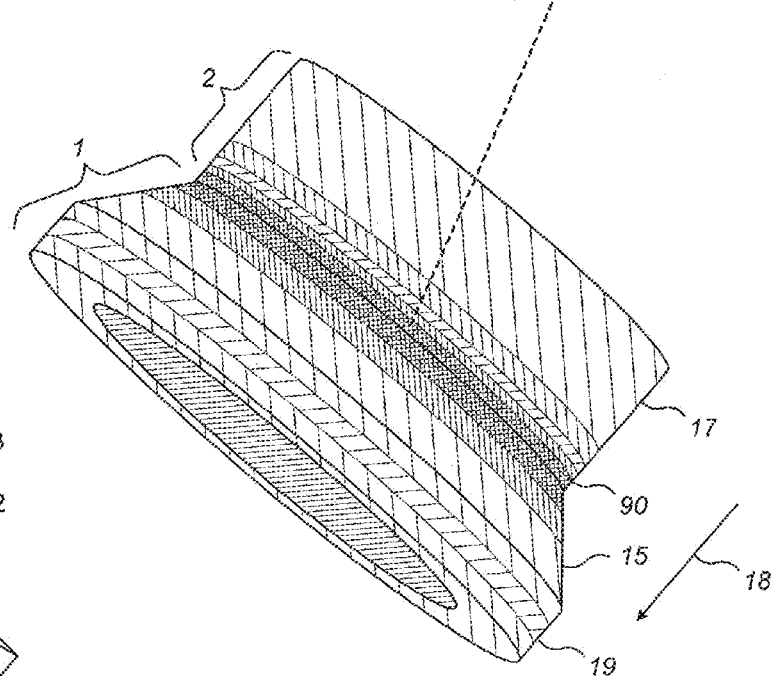

The intersection of this predefined plane with the outer surface of the sidewall of the plug can be seen in FIG. 1D, which shows the principal stress distribution of the plug when a uniform pressure is applied to the second end 12 of the plug by fluid being present in the recess 22.

This predefined plane 90 may therefore provide a weak area of the plug that intersects both the inner surface 23 (within the recess 22) and the outer surface 16 of the sidewall of the plug, and can be seen, for example, in FIG. 1D as a circumferential line of weakness 90 extending around the sidewall of the plug. This predefined plane 90 is therefore referred to herein as a predefined fracture plane, as it predefines the location and form of brittle fracture of the plug.

In other examples, the frangible plane 90 could be formed by a different structure or, for example, by a different material or composition. Of course, the frangible plane 90 need not be present in the frangible plug.

The means 100 for applying a force may be positioned to extend around the circumferential line of weakness, or predetermined fracture plane to assist in breaking the frangible plug. In the example shown in FIG. 1A, the shape memory alloy wire is positioned so as to be in the same plane as the predefined fracture plane 90.

The groove 110 described above could also be formed in the predefined fracture plane 90 of the plug. The groove 110 therefore extends around the outer circumference of the sidewall 16 in the predefined fracture plane 90.

The provision of a force to a plug having a predefined fracture plane therefore may result in a much cleaner break than to a plug that does not have such a predefined fracture plane.

Figure 2:
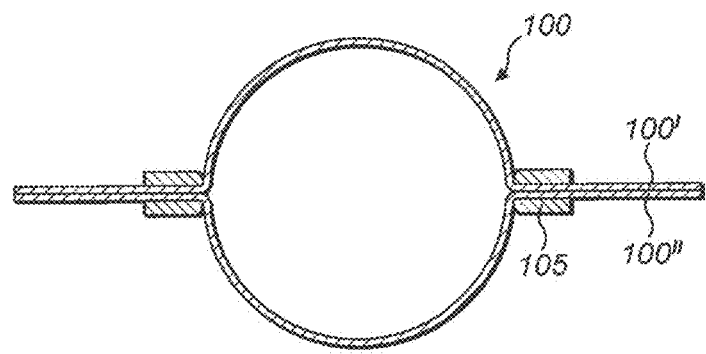
FIG. 2 shows a view of a shape memory alloy and crimping means.

FIG. 2 shows an example of a shape memory alloy wire 100. The shape memory alloy wire 100 in this example comprises two shape memory alloy wires 100' and 100". Shape memory alloy wire 100' extends around the outer circumference of the sidewall 16 of the plug in a semi-circle. Shape memory alloy wire 100" extends around the outer circumference of the sidewall 16 of the plug in a semi-circle opposite shape memory alloy wire 100'. The shape memory alloy wires 100' and 100" are combined to form a circle around the plug and are crimped (or welded) by crimp connectors 105. It is to be noted however that any number of shape memory alloy wires could be used. Also, windings of shape memory alloy wire could also be positioned around the outer circumference of the sidewall 16

Figure 3A:
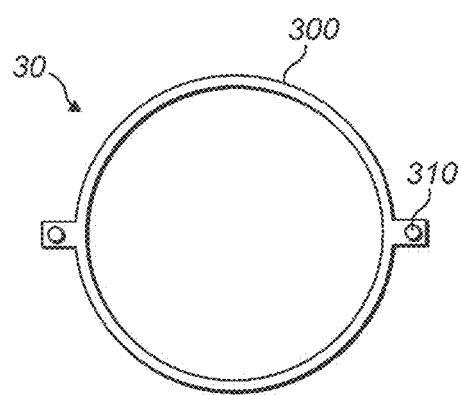
FIGS. 3A and 3B show alternative shape memory alloys to that shown in FIG. 2.
Figure 3B:
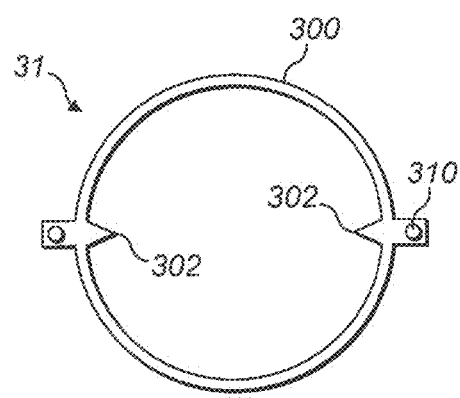

FIGS. 3A and 3B show alternative arrangements for a shape memory alloy. As described above, the shape memory alloy wires 100' and 100" may be welded or crimped. However, in the arrangements shown in FIGS. 3A and 3B, there is no need for welding or crimping.

As shown in FIG. 3A, the shape memory alloy 30 may be continuous and, in this example, there is provided a shape memory alloy wire 300. In the example, shown, the wire 300 is provided as a ring shape. Of course, other shapes may be provided to fit circumferentially around the sidewall 16 of the plug. The shape memory alloy 30 may also include electrical contacts 310 to be connected to a power supply source, as described above. In the example shown in FIG. 3A, the electrical contacts 310 are situated opposite each other on the shape memory alloy wire 300. Of course, the electrical contacts may be provided anywhere on the shape memory alloy wire 300. As mentioned above, the electrical contacts 310 are connected to a power supply source such that heat is applied to the shape memory alloy wire 300. The shape memory alloy wire 300 can then expand to cause the plug to fracture.

FIG. 3B shows a further alternative configuration to the shape memory alloy 30 as shown in FIG. 3A. In this example, the shape memory alloy 31 has shape memory alloy wire 300 and electrical contacts 310, as described above. In addition, the shape memory alloy 31 has portions 302 that assist in fracturing the plug. The portions 302 are provided on the shape memory alloy wire 300 and face inwards from the shape memory alloy wire 300. In the example shown in FIG. 3B, the portions 302 are needle-like protrusions that can rest against the sidewall 16 of the plug. When the shape memory alloy wire 300 is heated, the wire 300 expands in diameter and contracts in length, thereby providing a force on the sidewall 16 of the plug. The needle-like protrusions 302 assist in fracturing the plug when the wire is heated.

Figure 4A:
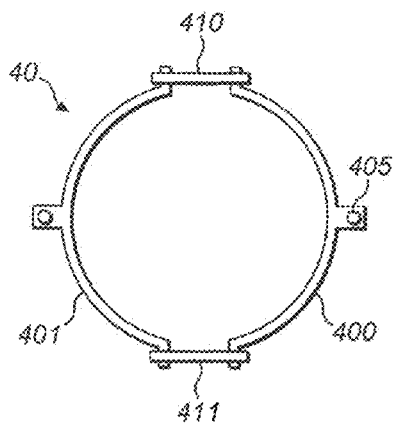
FIGS. 4A and 4B show alternative shape memory alloys to those shown in FIGS. 2, 3A and 3B.
Figure 4B:
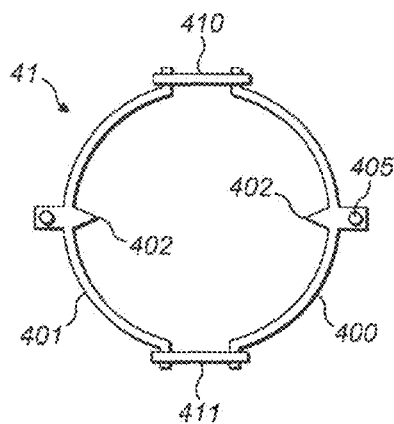

FIGS. 4A and 4B show further alternative arrangements for a shape memory alloy. FIG. 4A shows a shape memory alloy 40. In the example shown, two secondary metal wires 400 and 401 extend around the circumference of the plug. The secondary metal wires 400 and 401 are semi-circular in shape in this example, but may be other shapes. As shown in FIG. 4A, the shape memory alloys 410 and 411 may be arranged to hold the secondary metal wires 400 and 411 in place around the sidewall 16 of the plug. For example, a first single shape memory alloy wire 410 may be wound around an end of the secondary metal wires 400 and 401. A second shape memory alloy wire 411 may be wound around opposing ends of the secondary metal wires 400 and 401. The first and second shape memory alloy wires 410 and 411 hold the secondary metal wires 400 and 401 in place around the sidewall 16 of the frangible plug. Of course, more than one shape memory alloy wire may be wound around the ends of the secondary metal wires.

Electrical contacts 405 are positioned on the secondary metal wires 400 and 401, as with the shape memory alloy in FIGS. 3A and 3B. The electrical contacts 405 may be connected to a power supply to supply heat to the secondary metal wires 400 and 401. The heat conducts through the secondary metal wires 400 and 401 to the shape memory alloy wires 410 and 411, which causes expansion of the shape memory alloy wires 410 and 411. As the shape memory alloy wires 410 and 411 expand, the secondary metal wires 400 and 401 are drawn together and provide a force against the sidewall 16 of the plug causing the plug to fracture.

FIG. 4B shows a further alternative configuration to the shape memory alloy 30 as shown in FIG. 4A. In this example, the secondary metal wires 400 and 401 are held in position around the sidewall 16 of the plug with shape memory alloy wires 410 and 411. The secondary metal wires 400 and 401 may also include electrical contacts 405, as described above. In addition, the secondary metal wires 400 and 401 may have portions 402 that assist in fracturing the plug. The portions 402 may be provided on the secondary metal wires 400 and 401, and face inwards from the secondary metal wires 400 and 401. Of course, the portions 402 may be separate from the secondary metal wires and may be supported, or held in place, by the secondary metal wires 400 and 401. The portions 402 may be made from either a metallic or a non-metallic material. When the shape memory alloy is activated, the secondary metal wires 400 and 401 may provide a force to the portions 402 to assist in fracturing the plug. In the example shown in FIG. 4B, the portions 402 are needle-like protrusions that can rest against the sidewall 16 of the plug. When the shape memory alloy wires 410 and 411 are heated, the wires 410 and 411 expand, causing the secondary metal wires 400 and 401 to be drawn together such that a force may be provided on the sidewall 16 of the plug. The needle-like protrusions 302 assist in fracturing the plug when the shape memory alloy wires 410 and 411 are heated. As an example, the secondary metal wires 400 and 401 of FIGS. 4A and 4B may be made from steel. However, any other suitable electrical conductor could be used.

Figure 5A:
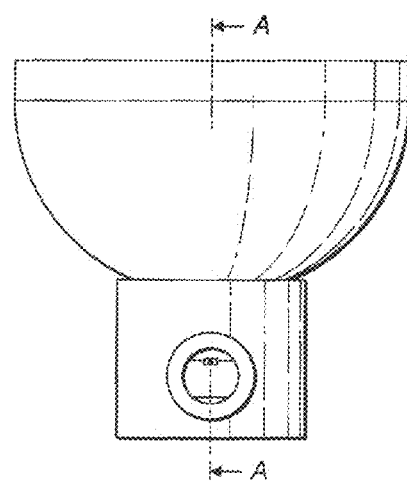
FIGS. 5A and 5B show a valve mechanism including the frangible plug of FIGS. 1A-1C.
Figure 5B:
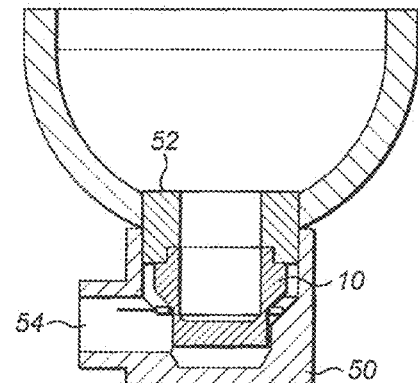

FIGS. 5A and 5B show a valve mechanism 5 that comprises a valve body 50, having an inlet port 52 and an outlet port 54, and a passageway 56 extending therebetween. A frangible plug 10, as described in conjunction with FIGS. 1A-1C, is held within the valve body 50 to block the passageway 56 between the inlet and outlet ports, and prevent fluid from flowing from the inlet port 52 to the outlet port 54 when the plug is intact.

The frangible plug 10, as described in FIGS. 1A-1C, has a first surface 14 as described above. The first surface 14, in use, is in flow communication with the outlet port 54. The plug 10, as mentioned above, has an opposing second end 12, which is at the inlet port side of the valve mechanism and which has a second surface, which, in use, is in flow communication with the inlet port 52.

In some examples, the outer circumferential surface of the sidewall 16 of at least a portion of the plug may contact the inner wall of the valve body itself, or may be held by some other means within the valve body and may further comprise a seal between the outer circumference of the sidewall of the plug and/or between the second end of the plug and/or the sidewalls of the recess within the plug.

This in combination with the fact that the first end of the plug is closed, provides a seal between the inlet and outlet ports of the valve body, which therefore closes the passageway between the inlet 52 and outlet 54 ports when the plug is intact.

The plug 10 is held within the valve body so that a portion of the outer surface of the plug is sealed to an inner surface of the valve body, as mentioned above. This may be achieved by brazing the ceramic to the valve body via an intermediary low expansion metal alloy. This provides a hermetic seal between the ceramic and the valve body. An example of an intermediary low expansion metal alloy is a Kovar™ joint. Other sealing means may also be used—for example an Iron Nickel Cobalt alloy with 29% Nickel and 17% Cobalt.

As a further example, the side wall, 16, of the plug provides two sections, 1, 2, one either side of the shape memory alloy 100, as shown in FIG. 1B. The seal between the valve body 50 is provided in only one of these sections, i.e. the second section, 2, as shown in FIG. 1B. This is the section of the plug that is on the inlet port side of the predefined fracture plane, which comprises the bevelled portion 15 of the outer surface, as well as the portion 19 of the outer surface that is at the second end 12 of the plug, that has a uniform diameter which is greater than the diameter of the first end 14 of the plug (i.e. the 'brim' of the top hat shape). The second section also comprises the portion 24 of the recess 22 which is of uniform diameter and extends from the second end of the plug up to the point at which the inner surface of the sidewall is bevelled (see FIG. 1B).

Upon application of an impact force to the plug, for example by using the shape memory alloy element 100, as described above, fracture of the plug therefore occurs across the sidewall 16 and the first section, 1 of the plug that lies on the side of the shape memory allow 100 that is not sealed to the inner walls of the valve body 50 and which, in this example, has a smaller outer diameter than the remainder of the plug, breaks away. The second section 2 of the plug that comprises the seal to the inner surface of the valve body generally stays intact. This therefore provides a clear open aperture at a predefined position within the plug.

Due to the creation of this clear aperture, the passageway between the inlet and outlet ports is opened up so that a substance contained in the recess can be discharged through the outlet port.

The valve mechanism described above is therefore a single-use, or repairable, valve mechanism that provides significant advantages over previous valve mechanisms, as when operated, it is able to create a clear opening between the inlet 52 and outlet 54 ports of the valve due to the fact that the plug 'cuts' through a sidewall using shape memory alloy.

In the example where there is provided a predefined fracture plane 90, the predefined fracture plane 90 lies generally perpendicular to the direction of the flow direction and so the resistance of the frangible plug to bursting or fracture due to applied pressure on the side of the inlet port 52 is maximised.

This valve mechanism also allows for the minimisation of the number of components and the complexity of the valve design, thereby reducing cost of the valve mechanism. It further retains the rapid opening and free flow characteristics of known devices and methods, whilst removing the need for pyrotechnic cartridges and providing hermiticity where required.

The frangible plug may be formed from a brittle material, for example a brittle ceramic, vitreous or polymeric material. For an alumina ceramic disc, the material may comprise a 96% dense Alumina $Al_2O_3$ ceramic.

These new types of seals provide significant advantages over known valve mechanisms as they provide hermiticity whilst also minimising the number of components and complexity of the valve design and therefore reducing the cost and providing higher reliability.

The invention claimed is:
1. A frangible plug for use in a valve mechanism, the frangible plug comprising:

a first section having a first end and an opposing second section having a second end and a cylindrical sidewall extending between the first and second ends;

means for applying a force on the cylindrical sidewall of the frangible plug such that the first section fractures from the opposing second section, and wherein the means for applying a force on said cylindrical sidewall extends circumferentially around the outer circumference of the sidewall;

a recess having an open end at the second end of the plug: and wherein said plug comprises a predefined fracture plane and wherein said plug is configured to fracture across said predefined fracture plane, and wherein said predefined fracture plane extends around the outer circumference of the sidewall: and a closed end, within the plug, with an inner surface of the cylindrical sidewall extending therebetween, said predefined fracture plane intersecting the sidewall within the recess to provide the predefined fracture line that extends around the inner circumference of the sidewall of the frangible plug:

wherein the means for applying a force on the cylindrical sidewall of the frangible plug is a one or more shape memory alloy wires;

wherein a groove is formed in the predefined fracture plane and wherein the one or more shape memory alloy wires is positioned in the groove.

2. The frangible plug of claim 1, wherein the means for applying a force on the cylindrical sidewall of the frangible plug is actuated on application of heat.

3. The frangible plug of claim 1, wherein the means for applying a force on the cylindrical sidewall of the frangible plug includes a shape memory alloy actuator.

4. The frangible plug of claim 1, wherein the one or more shape memory alloy wires are crimped or welded to each other at a point adjacent to the sidewall of the frangible plug.

5. The frangible plug of claim 1 wherein the shape memory alloy actuator further comprises one or more secondary metal wires.

6. The frangible plug of claim 3, wherein a groove is formed in the sidewall and wherein the shape memory alloy actuator is positioned in said groove.

7. The frangible plug of claim 1, wherein the diameter of the recess is smaller at the closed end of the recess than at the open end of the recess;

wherein the outer surface of the sidewall has a first bevelled portion, and the inner surface of the sidewall has a second bevelled portion; and wherein a part of the first bevelled portion of the outer surface that has the smallest diameter lies in the same plane as a part of the second bevelled portion of the inner surface that has the greatest diameter.

8. The frangible plug of claim 7, wherein the groove is located in the first section adjacent the first bevelled portion.

9. A valve mechanism comprising:

a valve body having an inlet port and an outlet port and a passageway extending therebetween; and a frangible plug as claimed in any preceding claim, wherein the plug is held within the valve body such that the plug blocks the passageway when intact and wherein, when the frangible plug is fractured, fluid flows from the inlet port to the outlet port.

10. The valve mechanism of claim 9, wherein the first end of the frangible plug is in flow communication with the outlet port and the second end of the frangible plug is in flow communication with the inlet port.

* * * * *